United States Patent
DaCosta et al.

(10) Patent No.: US 10,286,992 B2
(45) Date of Patent: May 14, 2019

(54) FLUID TREATMENT SYSTEM

(75) Inventors: Matthew DaCosta, London (CA); Jim Fraser, St. Thomas (CA); Glen E. Latimer, Chagrin Falls, OH (US)

(73) Assignee: TROJAN TECHNOLOGIES, London, ON (CA)

( * ) Notice: Subject to any disclaimer, the term of this patent is extended or adjusted under 35 U.S.C. 154(b) by 716 days.

(21) Appl. No.: 13/884,383

(22) PCT Filed: Nov. 3, 2011

(86) PCT No.: PCT/CA2011/001214
§ 371 (c)(1),
(2), (4) Date: Sep. 23, 2013

(87) PCT Pub. No.: WO2012/061924
PCT Pub. Date: May 18, 2012

(65) Prior Publication Data
US 2014/0042062 A1 Feb. 13, 2014

Related U.S. Application Data

(60) Provisional application No. 61/411,679, filed on Nov. 9, 2010.

(51) Int. Cl.
*C02F 1/32* (2006.01)
*B63J 4/00* (2006.01)
(Continued)

(52) U.S. Cl.
CPC ............ *B63J 4/002* (2013.01); *C02F 1/004* (2013.01); *C02F 1/325* (2013.01);
(Continued)

(58) Field of Classification Search
CPC .. A61L 2/10; B63B 9/00; B63B 13/00; B63B 57/00; B03C 1/00; B01D 29/00;
(Continued)

(56) References Cited

U.S. PATENT DOCUMENTS

| 6,419,821 B1 | 7/2002 | Gadgil et al. |
| 6,451,202 B1 | 9/2002 | Kuennen et al. |

(Continued)

FOREIGN PATENT DOCUMENTS

| MD | 3726 F1 | 10/2008 |
| WO | 2006/108600 A1 | 10/2006 |

(Continued)

OTHER PUBLICATIONS

International Search Report for International Application No. PCT/CA2011/001214 dated Mar. 5, 2012.
(Continued)

*Primary Examiner* — Hayden Brewster

(57) ABSTRACT

There is described a fluid treatment system that is particularly well suited for treating ballast water on a shipping vessel. The present fluid treatment system is characterized by having two general modes of operation. A so-called ballasting mode and a so-called deballasting mode. In the ballasting mode, water is pumped from the sea or other body of water in which the shipping vessel is located to a ballast fluid inlet in the present fluid treatment system. Thereafter, it passes through the filter separation and radiation treatment sections in the fluid treatment zone of the fluid treatment system. Next, the fluid exits the fluid outlet of the fluid treatment system and it is pumped to one or more ballast tanks that are located on the shipping vessel. In the deballasting mode, water contained in the ballast tank(s) is pumped to a deballasting fluid inlet of the fluid treatment system after which it is treated in the radiation section only—i.e., in the deballasting mode, water substantially bypasses the fluid separation section of the fluid treatment system. Next, the treated fluid exits the fluid outlet of the fluid treatment system and is discharged overboard the shipping vessel. A valve system is used to switch between ballasting mode and deballasting mode.

18 Claims, 14 Drawing Sheets

(51) Int. Cl.
*C02F 1/00* (2006.01)
*B63B 9/00* (2006.01)
*B63B 57/00* (2006.01)
*B01D 29/00* (2006.01)
*B01D 35/00* (2006.01)
*C02F 103/00* (2006.01)

(52) U.S. Cl.
CPC .............. *C02F 2103/008* (2013.01); *C02F 2201/3227* (2013.01); *C02F 2301/043* (2013.01); *C02F 2303/16* (2013.01); *Y10T 29/49826* (2015.01)

(58) Field of Classification Search
CPC ........ B01D 29/60; B01D 29/62; B01D 29/68; B01D 29/88; B01D 35/00; B01D 35/02; B01D 35/143; B01D 36/00; B01D 65/00; B01J 19/12; B63J 4/00; B63J 4/002
USPC ........................................................ 29/428
See application file for complete search history.

(56) References Cited

U.S. PATENT DOCUMENTS

| | | |
|---|---|---|
| 6,514,420 B2 | 2/2003 | Kuennen et al. |
| 6,602,425 B2 | 8/2003 | Gadgil et al. |
| 9,115,009 B2 * | 8/2015 | Fraser .................... C02F 1/004 |
| 2002/0050478 A1 * | 5/2002 | Talbert ................... C02F 9/005 |
| | | 210/742 |
| 2004/0011724 A1 | 1/2004 | Englehard |
| 2006/0186026 A1 | 8/2006 | Saleh |
| 2007/0125692 A1 | 6/2007 | Snyder |
| 2008/0190826 A1 * | 8/2008 | Miner .................... C02F 1/004 |
| | | 210/98 |
| 2008/0264875 A1 | 10/2008 | NeCamp |
| 2009/0321365 A1 * | 12/2009 | Eriksson ................. B63J 4/004 |
| | | 210/741 |
| 2010/0282661 A1 * | 11/2010 | Fraser .................... C02F 1/004 |
| | | 210/256 |
| 2011/0226681 A1 | 9/2011 | Lee et al. |

FOREIGN PATENT DOCUMENTS

WO 2009/144006 A1 12/2009
WO 2010/062032 A2 6/2010

OTHER PUBLICATIONS

English translation of the First Office Action for Chinese Patent Application No. 201180064477.0 dated Jul. 2, 2014.
Extended European Search Report for European Patent Application No. 11840464.9 dated Apr. 1, 2014.
Feb. 20, 2017 Office Action for European Patent Application No. 11 840 464.9.

* cited by examiner

FLUID TREATMENT SYSTEM

CROSS-REFERENCE TO RELATED APPLICATION

The present application claims the benefit under 35 U.S.C. § 119(e) of provisional patent application Ser. No. 61/411,679, filed Nov. 9, 2010, the contents of which are hereby incorporated by reference.

BACKGROUND OF THE INVENTION

Field of the Invention

In one of its aspects, the present invention relates to a fluid treatment system. More particularly, the present invention relates to a fluid treatment system for treatment of liquids such as water. Even more particularly, the present invention relates to a fluid treatment system for treatment of water such as ballast water from marine vessels. In another of its aspects, the present invention relates to a method for installing a fluid treatment device in a shipping vessel.

Description of the Prior Art

Fluid treatment systems are generally known in the art. More particularly, ultraviolet (UV) radiation fluid treatment systems are generally known in the art. Early treatment systems comprised a fully enclosed chamber design containing one or more radiation (preferably UV) lamps. Certain problems existed with these earlier designs. These problems were manifested particularly when applied to large open flow treatment systems which are typical of larger scale municipal waste water or potable water treatment plants. Thus, these types of reactors had associated with them the following problems:

relatively high capital cost of reactor;
difficult accessibility to submerged reactor and/or wetted equipment (lamps, sleeve cleaners, etc);
difficulties associated with removal of fouling materials from fluid treatment equipment;
relatively low fluid disinfection efficiency, and/or
full redundancy of equipment was required for maintenance of wetted components (sleeves, lamps and the like).

The shortcomings in conventional closed reactors led to the development of the so-called "open channel" reactors.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 Patents) all describe gravity fed fluid treatment systems which employ ultraviolet (UV) radiation.

Such systems include an array of UV lamp modules (e.g., frames) which include several UV lamps each of which are mounted within sleeves which extend between and are supported by a pair of legs which are attached to a crosspiece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the flow rate of the fluid past the lamps. Typically, one or more UV sensors may be employed to monitor the UV output of the lamps and the fluid level is typically controlled, to some extent, downstream of the treatment device by means of level gates or the like.

The Maarschalkerweerd #1 Patents teach fluid treatment systems which were characterized by improved ability to extract the equipment from a wetted or submerged state without the need for full equipment redundancy. These designs compartmentalized the lamp arrays into rows and/or columns and were characterized by having the top of the reactor open to provide free-surface flow of fluid in a "top open" channel.

The fluid treatment system taught in the Maarschalkerweerd #1 Patents is characterized by having a free-surface flow of fluid (typically the top fluid surface was not purposely controlled or constrained). Thus, the systems would typically follow the behaviour of open channel hydraulics. Since the design of the system inherently comprised a free-surface flow of fluid, there were constraints on the maximum flow each lamp or lamp array could handle before either one or other hydraulically adjoined arrays would be adversely affected by changes in water elevation. At higher flows or significant changes in the flow, the unrestrained or free-surface flow of fluid would be allowed to change the treatment volume and cross-sectional shape of the fluid flow, thereby rendering the reactor relatively ineffective. Provided that the power to each lamp in the array was relatively low, the subsequent fluid flow per lamp would be relatively low. The concept of a fully open channel fluid treatment system would suffice in these lower lamp power and subsequently lower hydraulically loaded treatment systems. The problem here was that, with less powerful lamps, a relatively large number of lamps was required to treat the same volume of fluid flow. Thus, the inherent cost of the system would be unduly large and/or not competitive with the additional features of automatic lamp sleeve cleaning and large fluid volume treatment systems.

This led to the so-called "semi-enclosed" fluid treatment systems.

U.S. Pat. Nos. 5,418,370, 5,539,210 and Re36,896 (all in the name of Maarschalkerweerd and all assigned to the assignee of the present invention and hereinafter referred to as the Maarschalkerweerd #2 Patents) all describe an improved radiation source module for use in gravity fed fluid treatment systems which employ UV radiation. Generally, the improved radiation source module comprises a radiation source assembly (typically comprising a radiation source and a protective (e.g., quartz) sleeve) sealingly cantilevered from a support member. The support member may further comprise appropriate means to secure the radiation source module in the gravity fed fluid treatment system.

The Maarschalkerweerd #2 Patents are characterized by having a closed surface confining the fluid being treated in the treatment area of the reactor. This closed treatment system had open ends which, in effect, were disposed in an open channel. The submerged or wetted equipment (UV lamps, cleaners and the like) could be extracted using pivoted hinges, sliders and various other devices allowing removal of equipment from the semi-enclosed reactor to the free surfaces.

The fluid treatment system described in the Maarschalkerweerd #2 Patents was typically characterized by relatively short length lamps which were cantilevered to a substantially vertical support arm (i.e., the lamps were supported at one end only). This allowed for pivoting or other extraction of the lamp from the semi-enclosed reactor. These significantly shorter and more powerful lamps inherently are characterized by being less efficient in converting electrical energy to UV energy. The cost associated with the equipment necessary to physically access and support these lamps was significant.

Historically, the fluid treatment modules and systems described in the Maarschalkerweerd #1 and #2 Patents have found widespread application in the field of municipal waste water treatment (i.e., treatment of water that is discharged to a river, pond, lake or other such receiving stream).

In the field of municipal drinking water, it is known to utilize so-called "closed" fluid treatment systems or "pressurized" fluid treatment systems.

Closed fluid treatment devices are known—see, for example, U.S. Pat. No. 5,504,335 (Maarschalkerweerd #3). Maarschalkerweerd #3 teaches a closed fluid treatment device comprising a housing for receiving a flow of fluid. The housing comprises a fluid inlet, a fluid outlet, a fluid treatment zone disposed between the fluid inlet and the fluid outlet, and at least one radiation source module disposed in the fluid treatment zone. The fluid inlet, the fluid outlet and the fluid treatment zone are in a collinear relationship with respect to one another. The at least one radiation source module comprises a radiation source sealably connected to a leg which is sealably mounted to the housing. The radiation source is disposed substantially parallel to the flow of fluid.

U.S. Pat. No. 6,500,346 [Taghipour et al. (Taghipour)] also teaches a closed fluid treatment device, particularly useful for ultraviolet radiation treatment of fluids such as water. The device comprises a housing for receiving a flow of fluid. The housing has a fluid inlet, a fluid outlet, a fluid treatment zone disposed between the fluid inlet and the fluid outlet and at least one radiation source having a longitudinal axis disposed in the fluid treatment zone substantially transverse to a direction of the flow of fluid through the housing. The fluid inlet, the fluid outlet and the fluid treatment zone are arranged substantially collinearly with respect to one another. The fluid inlet has a first opening having: (i) a cross-sectional area less than a cross-sectional area of the fluid treatment zone, and (ii) a largest diameter substantially parallel to the longitudinal axis of the at least one radiation source assembly.

The various embodiments described in the Maarshalkerweerd #1 Patents, the Maarschalkerweerd #2 Patents and the Maarschalkerweerd #3 Patents relate to land-based fluid radiation treatment systems. Typically, the fluid radiation treatment systems are used in conjunction with other treatment systems in the municipal wastewater treatment plant or the municipal drinking water treatment plant, as the case may be. In such installations, various conduit systems and the like are used to interconnect the fluid radiation treatment system to the other fluid treatment systems in the installation.

It is conventional in such installations to compartmentalize each treatment system in the installation such that each treatment system is configured to create its own optimized flow fluid. This approach has been satisfactory for land-based fluid treatment systems.

A problem arises in applications of fluid treatment systems where a very small footprint is available for overall fluid treatment. This problem arises particularly when it is desired to treat ballast water in shipping vessels.

The continuous introduction and spread of aquatic non-indigenous species is a serious threat to the marine environment. Unlike other forms of pollution, once a non-indigenous species establishes itself, it will remain in its new location. While calculating the potential side effects on human food supply, economy, health and overall biodiversity is difficult, there is widespread acceptance that the cost could be staggering.

One primary culprit for introduction and spread of aquatic non-indigenous species is due to unabated transferance of ballast water from shipping vessels. Ballast water taken on in one body of water or ecological zone and released into another body of water or ecological zone can introduce so-called Aquatic Invasive Species (AIS) that has the potential to cause detrimental impact on one or more of the biodiversity, economy and human health of the receiving community.

Typically, a shipping vessel will take on ballast water (fresh water or salt water) and at a source point and hold this in onboard ballast tanks and/or cargo holds to increase stability and maneuverability during transit. Once the shipping vessel arrives at its destination point, the ballast water is typically discharged from the onboard ballast tanks and/or cargo holds. Also, it is common for ballast water to be taken on and/or discharged during transit between the source point and the destination point. It has been estimated that 3-5 billon tonnes of ballast water is transferred in this manner on an annual basis.

International patent application number PCT/CA2010/000701 [Fraser] teaches a fluid treatment system particularly well suited for installation on a shipping vessel for treatment of ballast water. The fluid treatment system comprises a housing within which is disposed a fluid separation section (the separation section may include a single separation device or a combination of two or more similar or disimilar separation devices) and a fluid radiation section in fluid communication with one another. The fluid separation section removes solids in the fluid and the fluid radiation section irradiates the fluid to deactive microorganisms in the fluid. The fluid separation section and the fluid radiation section are configured to have a substantially common fluid flow path which significantly reduces the space or footprint requirement of and/or significantly reduces hydraulic head loss (pressure drops) in the overall fluid treatment system while allowing the two sections to perform their respective functions.

While the fluid treatment system taught by Fraser represents an advance in the art, there is room for improvement. Specifically, the actual embodiments of the fluid treatment system taught by Fraser are focussed on treatment of water during filling of the ballast tanks of the shipping vessel (also referred to herein as "ballasting"). The fluid treatment system taught by Fraser is not focussed on how the system is operated when it is desired to empty the ballast tanks (also referred to herein as "deballasting")—i.e., the treated water would simply be discharged overboard. However, it would be desirable to have a mode of operation of the fluid treatment system whereby the fluid could be treated to further disinfect it while maintaining the overall efficiency of the system. In addition, there are instances where it is desirable to be able to bypass entirely the fluid treatment system (e.g., in an emergency situation). Further, Fraser is silent with respect to a method for retrofit installation of the fluid treatment system in an existing shipping vessel. These shortcomings are not addressed by the specific embodiments taught by Fraser.

It would be desirable to have a fluid treatment system which addresses the above-mentioned deficiencies of Fraser.

SUMMARY OF THE INVENTION

It is an object of the present invention to obviate or mitigate at least one of the above-mentioned disadvantages of the prior art.

It is another object of the present invention to provide a novel fluid treatment system.

Accordingly, in one of its aspects, the present invention provides a fluid treatment system comprising:

a first fluid inlet;
a second fluid inlet;
a fluid outlet;
a fluid treatment zone comprising a housing within which is disposed a fluid separation section and a fluid radiation section in fluid communication with one another and in fluid communication with the first fluid inlet, the second fluid inlet and the fluid outlet; and
a valve system configured to operate in: (i) a first mode in which fluid passes through the fluid separation section and fluid radiation section, and (ii) a second mode in which fluid substantially bypasses the fluid separation section and passes through the fluid radiation section.

In another of its aspects, the present invention relates to a shipping vessel comprising the present fluid treatment system.

In another of its aspects, the present invention provides a method for installing the present fluid treatment system in a shipping vessel.

Thus, the present inventors have discovered the novel fluid treatment system that is particularly well suited for treating ballast water on a shipping vessel. The present fluid treatment system is characterized by having two general modes of operation. A so-called ballasting mode and a so-called deballasting mode.

In the ballasting mode, water is pumped from the sea or other body of water in which the shipping vessel is located to a ballast fluid inlet in the present fluid treatment system. Thereafter, it passes through the filter separation and radiation treatment sections in the fluid treatment zone of the fluid treatment system. Next, the fluid exits the fluid outlet of the fluid treatment system and it is pumped to one or more ballast tanks that are located on the shipping vessel.

In the deballasting mode, water contained in the ballast tank(s) is pumped to a deballasting fluid inlet of the fluid treatment system after which it is treated in the radiation section only—i.e., in the deballasting mode, water substantially bypasses the fluid separation section of the fluid treatment system. Next, the treated fluid exits the fluid outlet of the fluid treatment system and is discharged overboard the shipping vessel.

A valve system is used to switch between ballasting mode and deballasting mode.

In a first preferred embodiment, the present fluid treatment system also includes additional valves to allow for a complete bypass of the present fluid treatment system (e.g., in an emergency situation) so that water may be pumped from the sea or other body of water in which the shipping vessel is located directly and to the ballast tank(s). In this embodiment, deballasting can also be conducted while bypassing the fluid treatment system.

In another preferred embodiment, a filter backwash function is added to the fluid separation section of the fluid treatment system to allow for backwashing of individual filter elements in the fluid separation section. Actuation of fluid backwash can be achieved through the use of an appropriately installed valve and a discharge line.

Throughout the specification, reference is made to use of the present fluid treatment system to treat ballast water on a shipping vessel. While this is a highly preferred embodiment of the present fluid treatment system, it should be understood that the present fluid treatment system is not restricted to use or treating ballast water on a shipping vessel.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE PREFERRED EMBODIMENTS

Figure 1:
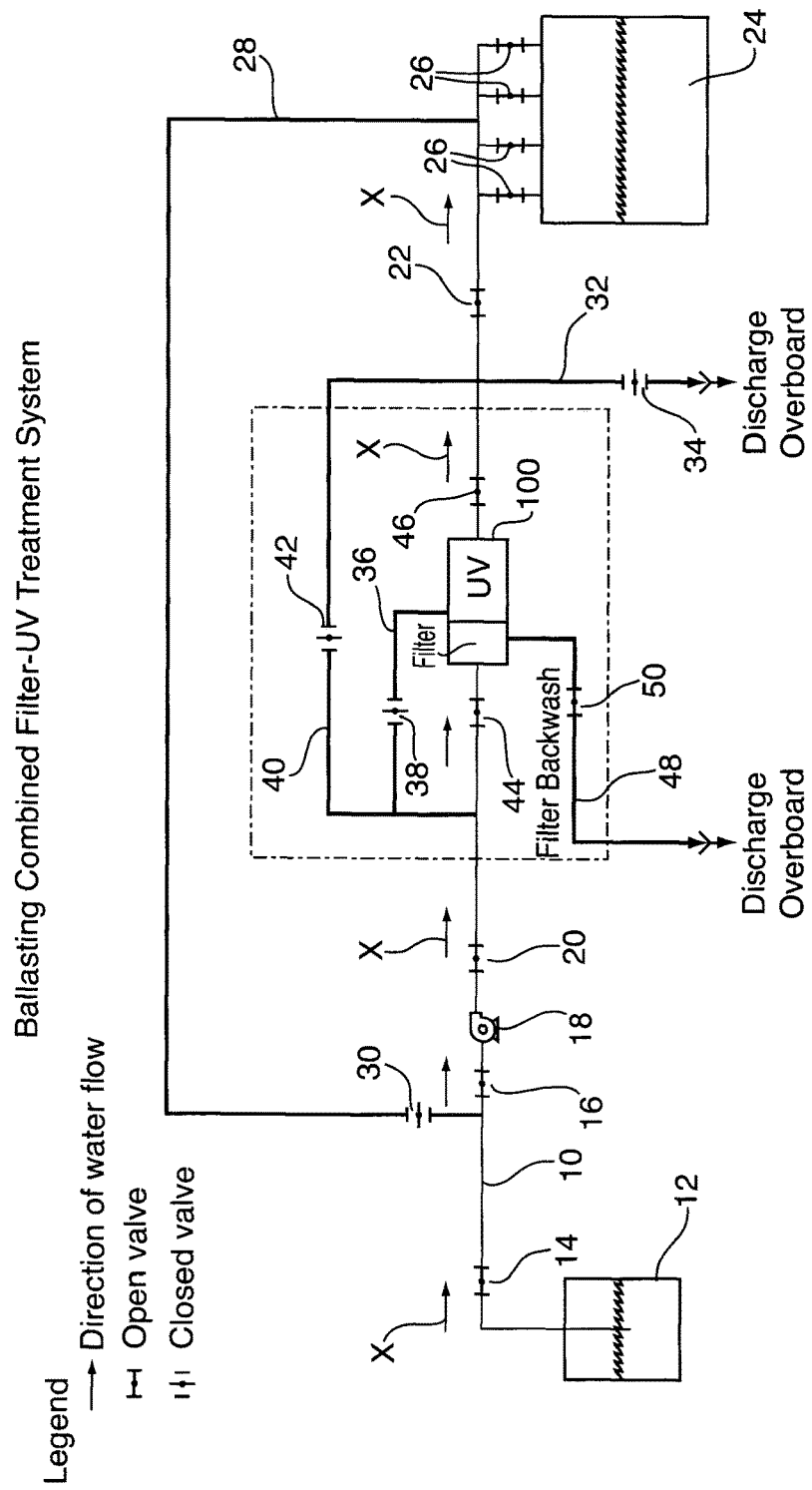
FIG. 1 illustrates a schematic of installation and use of a preferred embodiment of the present fluid treatment system in a shipping vessel operating in the ballasting mode.

In one of its aspects, the present invention relates to a fluid treatment system fluid treatment system comprising: a first fluid inlet; a second fluid inlet; a fluid outlet; a fluid treatment zone comprising a housing within which is disposed a fluid separation section and a fluid radiation section in fluid communication with one another and in fluid communication with the first fluid inlet, the second fluid inlet and the fluid outlet; and a valve system configured to operate in: (i) a first mode in which fluid passes through the fluid separation section and fluid radiation section, and (ii) a second mode in which fluid substantially bypasses the fluid separation section and passes through the fluid radiation section. Preferred embodiments of this embodiment of the present invention may include any one or a combination of any two or more any of the following features:

- the valve system may comprise a first valve element and a second valve element;
- in the first mode, the first valve element may be in an open position and the second valve element may be in a closed position;
- in the second mode, the first valve element may be in a closed position and the second valve element may be in an open position;
- the fluid separation section may be in fluid communication with the fluid inlet;
- the fluid radiation section may be in fluid communication with the fluid outlet;
- the fluid separation section may be in fluid communication with the fluid inlet, and the fluid radiation section is in fluid communication with the fluid outlet;

the fluid treatment zone may be configured to receive a pressurized flow of fluid;

the fluid treatment zone may be configured to constrain on all sides a flow of fluid received from the fluid inlet;

the fluid separation section may comprise a filter element (e.g., bag filtration, cartridge filtration with a wide variety of filtering materials, ceramic filtration, screen filtration, woven wire filtration, cloth filtration, wedgwire filtration, plastic filtration granular filtration (sacrificial and non-sacrificial) and any combination of two or more of these);

the fluid separation section may comprise a cyclone element;

the fluid separation section may comprise a membrane element;

the fluid separation section may comprise at least one candle filter;

the at least one candle filter may comprise an elongate filter housing having an filter inlet in fluid communication with the fluid inlet and a filter outlet in fluid communication with fluid radiation section;

the filter housing may comprise a substantially cylindrical portion;

the elongate filter housing may be fluid permeable between the filter inlet and the filter outlet to allow for fluid to pass laterally from an interior to an exterior of the filter housing or from an exterior to an interior of the filter housing;

the filter housing may comprise a filter element on an inner surface of the filter housing;

the filter housing may comprise a filter element on substantially an entire inner surface of the filter housing;

the filter element may comprise a ceramic material;

the filter element may comprise a porous ceramic material;

the filter element may comprise a metal tube;

the filter element may comprise a sintered metal tube;

the filter element may comprise an expanded sheet material;

the filter element comprises an expanded metal sheet material;

the filter element may comprise a mesh screen;

the filter element may comprise a woven mesh screen;

the filter element may comprise a filter cloth material;

the filter element may comprise a non-undulating surface;

the filter element may comprise an undulating surface;

the fluid separation section may comprise a plurality of separation elements arranged in a separation element array;

each separation element may be configured to receive a flow of fluid;

each separation element may be configured to receive an independent flow of fluid with respect to an adjacent separation element;

each separation element may be elongate;

each separation element may comprise a longitudinal axis that is substantially parallel with respect to a longitudinal axis of at least two adjacent separation elements;

each separation element may comprise a longitudinal axis that is substantially equidistant from longitudinal axis of three adjacent separation elements;

each separation element may comprise a longitudinal axis that is substantially equidistant from longitudinal axis of four adjacent separation elements;

each separation element may comprise a longitudinal axis that is substantially equidistant from longitudinal axis of five adjacent separation elements;

the fluid separation section may comprise a backwash element;

the backwash element may comprise a backwash valve element configured to be operated between an open position in which at least one separation element is backwashed and a closed position to defined a backwash cycle;

the backwash element may be configured to backwash single separation element per backwash cycle the backwash element may be configured to backwash a pair of separation elements per backwash cycle;

the backwash element may comprise an arm portion configured to be movable with respect to adjacent separation elements;

the backwash element may comprise an arm portion configured to be rotatably movable with respect to adjacent separation elements;

the arm portion may be connected to a vent element;

the valve system may be further configured to operate in a third mode in which fluid substantially bypasses the fluid treatment system;

the valve system may comprise a third valve;

in the third mode, the first valve element is in closed position, the second valve element is in a closed position and the third valve element is in an open position;

the fluid radiation section may comprise at least one elongate radiation source assembly;

the at least one elongate radiation source assembly may comprise at least one elongate radiation source;

the at least one elongate radiation source may comprise an ultraviolet radiation source;

the ultraviolet radiation source may comprise a low pressure ultraviolet radiation lamp;

the ultraviolet radiation source may comprise a low pressure high output ultraviolet radiation lamp;

the ultraviolet radiation source may comprise a medium pressure ultraviolet radiation lamp;

the ultraviolet radiation source may comprise a dielectric barrier discharge (DBD) ultraviolet radiation lamp;

the ultraviolet radiation source may comprise an ultraviolet radiation light emitting diode (LED) or an array of ultraviolet radiation LEDs;

the at least one elongate radiation source may be disposed in a protective sleeve;

the protective sleeve may be constructed of a radiation transparent material;

the protective sleeve may be constructed of quartz;

the elongate radiation source assembly may comprise a longitudinal axis that is configured to be transverse to the direction of fluid flow through the fluid radiation section;

the elongate radiation source assembly may comprise a longitudinal axis that is configured to be orthogonal to the direction of fluid flow through the fluid radiation section;

the fluid treatment system may comprise a plurality of radiation source assemblies;

the plurality of radiation source assemblies may be arranged in a radiation source array;

the array may comprise a central portion in which is disposed the fluid separation section;

the fluid separation section and the fluid radiation section may be disposed serially along a direction of fluid flow through the fluid treatment zone;

the fluid separation section and the fluid radiation section may be disposed coaxially along a direction of fluid flow through the fluid treatment zone; and/or the fluid separation section and the fluid radiation section may be disposed coaxially along a direction of fluid flow through the fluid separation section.

Another aspect of the present invention relates to a shipping vessel comprising the present fluid treatment system, preferably having one or more of the above preferred features.

Other aspects of the present invention relate to a method for installing the present fluid treatment system in a shipping vessel in a shipping vessel having at least one ballast tank configured to receive ballast water, a ballast pump for pumping water to the at least one ballast tank and a first plumbing line to convey ballast water from the ballast pump to the at least one ballast tank.

In a first embodiment, the method comprises the steps of:
cutting the first plumbing line;
splitting an upstream cut portion of the first plumbing line into a main plumbing line and a bypass plumbing line;
connecting the main plumbing line to the first fluid inlet;
connecting the bypass plumbing line to the second fluid inlet;
connecting a downstream cut portion of the first plumbing line to the fluid outlet;
installing the first valve element in the main plumbing line upstream of the fluid treatment system; and
installing the second valve element in the bypass line upstream of the fluid treatment system.

In a second embodiment where the fluid separation section of the fluid treatment system comprises a backwash element, the method comprises the steps of:
cutting the first plumbing line;
splitting an upstream cut portion of the first plumbing line into a main plumbing line and a bypass plumbing line;
connecting the main plumbing line to the first fluid inlet;
connecting the bypass plumbing line to the second fluid inlet;
connecting a downstream cut portion of the first plumbing line to the fluid outlet;
connecting discharge portion of the backwash element to a overboard discharge plumbing line;
installing the first valve element in the main plumbing line upstream of the fluid treatment system;
installing the second valve element in the bypass line upstream of the fluid treatment system; and
installing the backwash valve element in the overboard discharge plumbing line.

In a third embodiment where it is desired to be able to bypass the fluid treatment system entirely, the method comprises the steps of:
cutting the first plumbing line;
splitting an upstream cut portion of the first plumbing line into a main plumbing line, a first bypass plumbing line and a second bypass plumbing line;
connecting the main plumbing line to the first fluid inlet;
connecting the first bypass plumbing line to the second fluid inlet;
connecting a downstream cut portion of the first plumbing line to the fluid outlet;
connecting the second bypass plumbing line to the downstream cut portion of the first plumbing line
installing the first valve element in the main plumbing line upstream of the fluid treatment system;
installing the second valve element in the first bypass line upstream of the fluid treatment system; and installing the third valve element in the second bypass line.

With respect to each of the above-mentioned methods, the order of conducting the various steps is not particularly restricted—i.e., order is not necessarily in the sequence shown for each method.

The above described method for installing the present fluid treatment system involves mechanically installation. Such mechanical installation is part of an overall installation scheme that may be conveniently summarized as follows:

1. Determine optimum location aboard the shipping vessel for fluid treatment system and supporting equipment and develop an installation plan.
2. Locate fluid treatment system and supporting equipment to the predetermined locations as per the installation plan.
3. Proceed with the mechanical installation as per the installation plan (the method described above).
4. Proceed with the electrical installation as per the installation plan.
5. Interface fluid treatment system controls with existing ships control system.
6. Debug fluid treatment system installation, if necessary.
7. Commence with fluid treatment system start up.

Step 1—Find the most suitable location to install the fluid treatment system taking into account space available, ease of installation (can system fit through existing hatches between top side deck and proposed installation location), proximity to existing ballast water plumbing and proximity to required power infrastructure.

Step 2—Move fluid treatment equipment into position while relocating any existing mechanical and electrical infrastructure required for installation.

Step 3—Proceed with mechanical installation (see FIGS. 1-4). Mount fluid treatment system to ship structure. Cut into existing ballast water plumbing installing the valve bypass arrangement allowing for complete fluid treatment system bypass in the event of ship emergency. This bypass preferably provides for manual control in the event of an automatic control failure. The valve bypass plumbing is preferably extended to the inlet and outlet of the fluid treatment system completing the circuit from the ballast water pumps through the fluid treatment system to the ballast water tanks forming the flow path for the ballast cycle. The plumbing is preferably extended from the ballast water tanks through the ballast water pumps and back to the bypass connection of the fluid treatment system providing a flow path that will bypass the filtration portion of the fluid treatment system during the deballast cycle. This plumbing is then extended from the outlet of the fluid treatment system to overboard of the ship completing the deballast cycle. Install the appropriate actuated valves and flow monitoring equipment needed to complete an installation that can be controlled remotely from the ballast water control system as part of the ships controls.

Step 4—Proceed with the electrical installation securing all panels as necessary. Locate the control panel in an appropriate position within the ships control room or other suitable location. Appropriate electrical connections are made to ships control system and to the fluid treatment system to complete installation. The switch gear panel is located in a suitable location taking into consideration the location of the main power supply that will be feeding this electrical panel. Appropriate electrical connections are made to the ships main power supply and to the fluid treatment system control panel and driver panel to complete installation. The driver panel is located within close proximity of the ballast water treatment system (10 meters of cable length available). The supplied cables from the driver panel are connected to the UV lamps located in the fluid treatment system. The solenoid panel is located within reasonable proximity to the fluid treatment system. Existing wiring and tubing from this panel is connected to the fluid treatment system and the necessary control and power wires to the appropriate electrical panels.

Step 5—Fluid treatment system controls are interfaced to existing ships control system. Appropriate programming is provided to coordinate the fluid treatment system controls to the ships controls making full operation of the fluid treatment system available from the current ballast water control panel aboard the ship.

Step 6—Debug ballast water treatment installation. Electrical connections are checked to make sure they are correct and are fastened securely. The system is powered up to simulate a treatment operation. Checks for proper operation are made taking care to observe actuated valve positions as control system is cycled through the various steps. Once the electrical system has been verified to be working properly and all plumbing connections have been checked to make sure they are correct and tightened properly, the fluid treatment system is ready to be pressurized. The ballast water pumps are energized at the lowest setting possible and the necessary valves are opened to allow the fluid treatment system to be filled with water. Once the fluid treatment system is filled with water, the outlet valves are closed and pressure is allowed to begin to build within the fluid treatment system. As the pressure builds, checks are made for any leaks and correction, as necessary, is made. The system is fully pressurized to the maximum pressure rating of the system or the maximum pressure available within the systems maximum pressure rating. Once this pressure has been reached, the pressure is held for the necessary period of time as to determine that there are no leaks throughout the system and its associated plumbing.

Step 7—Commence with ballast water treatment system startup. Once ballast water system function has been verified and tested the system is ready to be brought online. Once system has been put on line with the ships ballast water system, operation of the fluid treatment system is observed for an appropriate amount of time to ensure proper trouble free operation.

With reference to FIGS. 1-4, there is illustrated a schematic for operation of a fluid treatment system 100 in a variety of modes on a shipping vessel.

As shown, fluid treatment system 100 comprises a filter section (this corresponds to the fluid separation section) and a UV section (this corresponds to the fluid radiation section). A main plumbing line 10 connects a supply of sea water from a sea chest 12 to fluid treatment system 100. Main plumbing line 10 includes suction valves 14,16, a ballast pump 18, a discharge valve 20 and a main valve 22. Main plumbing line 10 is connected to a ballast tank 24 via four tank valves 26. A suction line 28 is connected to main plumbing line 10 and contains a suction valve 30. A discharge line 32 is connected to main plumbing line 10 and includes a discharge valve 34. A filter bypass line 36 is connected to main plumbing line 10 and includes filter bypass valve 38.

A fluid treatment system bypass line 40 is connected to filter bypass line 36 and main plumbing line 10 and includes a fluid treatment system bypass valve 42. Bypass valves 44,46 are disposed in main plumbing line 10 on either side of fluid treatment system 100.

A filter backwash line 48 emanates from the filter section of fluid treatment system 100 and includes a filter backwash valve 50.

With continued reference to FIG. 1, when it is desired to fill ballast tank 24 with sea water that has been treated by fluid treatment system 100, the valves are oriented as shown in FIG. 1 and as follows:

| Valve | Position |
|---|---|
| 14 | open |
| 16 | open |
| 20 | open |
| 22 | open |
| 26 | open |
| 30 | closed |
| 34 | closed |
| 38 | closed |
| 42 | closed |
| 44 | open |
| 46 | open |
| 50 | open |

This results in water travelling from sea chest 12 through fluid treatment system 100 (wherein it is filtered and subjected to radiation) and into ballast tanks 24 in the direction of arrows X. Also during this mode, the filter backwash operation is conducted.

Figure 2:
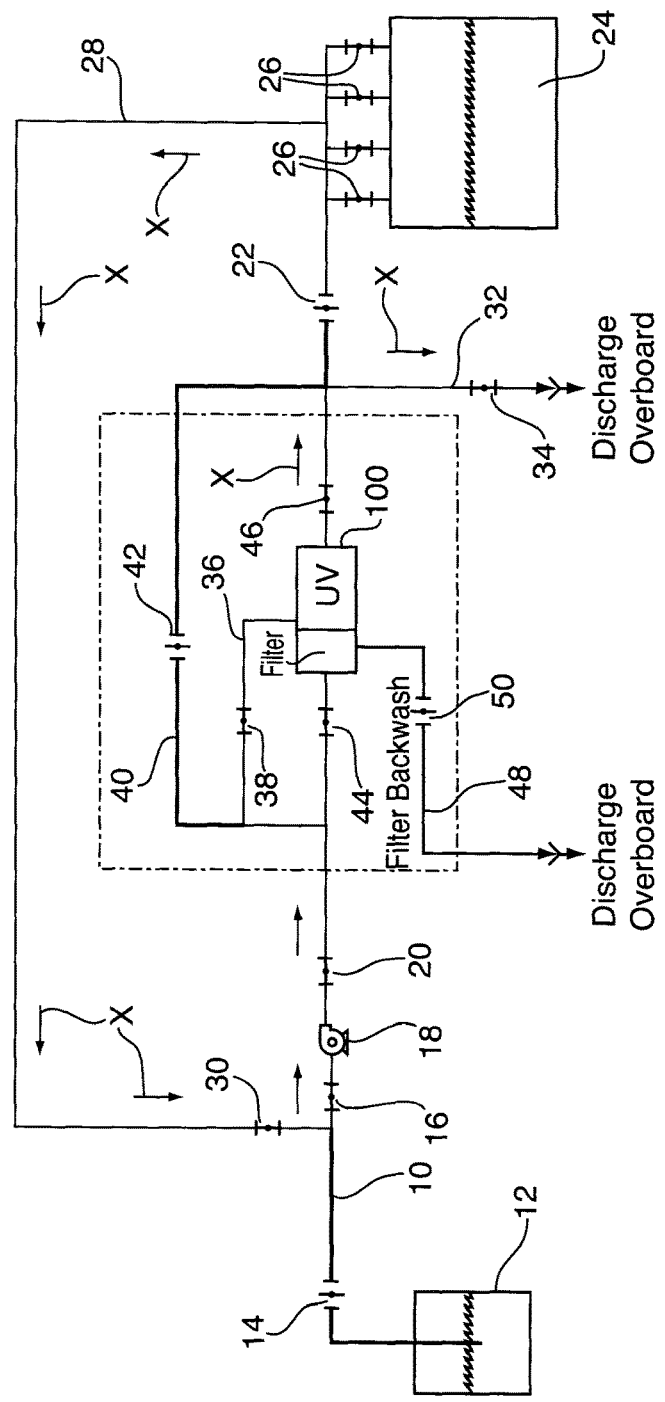
FIG. 2 illustrates a schematic of installation and use of a preferred embodiment of the present fluid treatment system in a shipping vessel operating in the deballasting mode.

When it is desired to deballast the sea water from ballast tanks 24, the valves are adjusted as shown in FIG. 2 and as follows:

| Valve | Position |
|---|---|
| 14 | closed |
| 16 | open |
| 20 | open |
| 22 | closed |
| 26 | open |
| 30 | open |
| 34 | open |
| 38 | open |
| 42 | closed |
| 44 | open |
| 46 | open |
| 50 | closed |

This results in water flowing from ballast tanks 24 through suction line 28, a portion of main plumbing line 10, filter bypass line 36, the UV section (only) of fluid treatment 100 and discharge line 32 in the direction of arrows X. Notably, sea water does not pass through the filter section (fluid separation section) of fluid treatment system 100.

Figure 3:
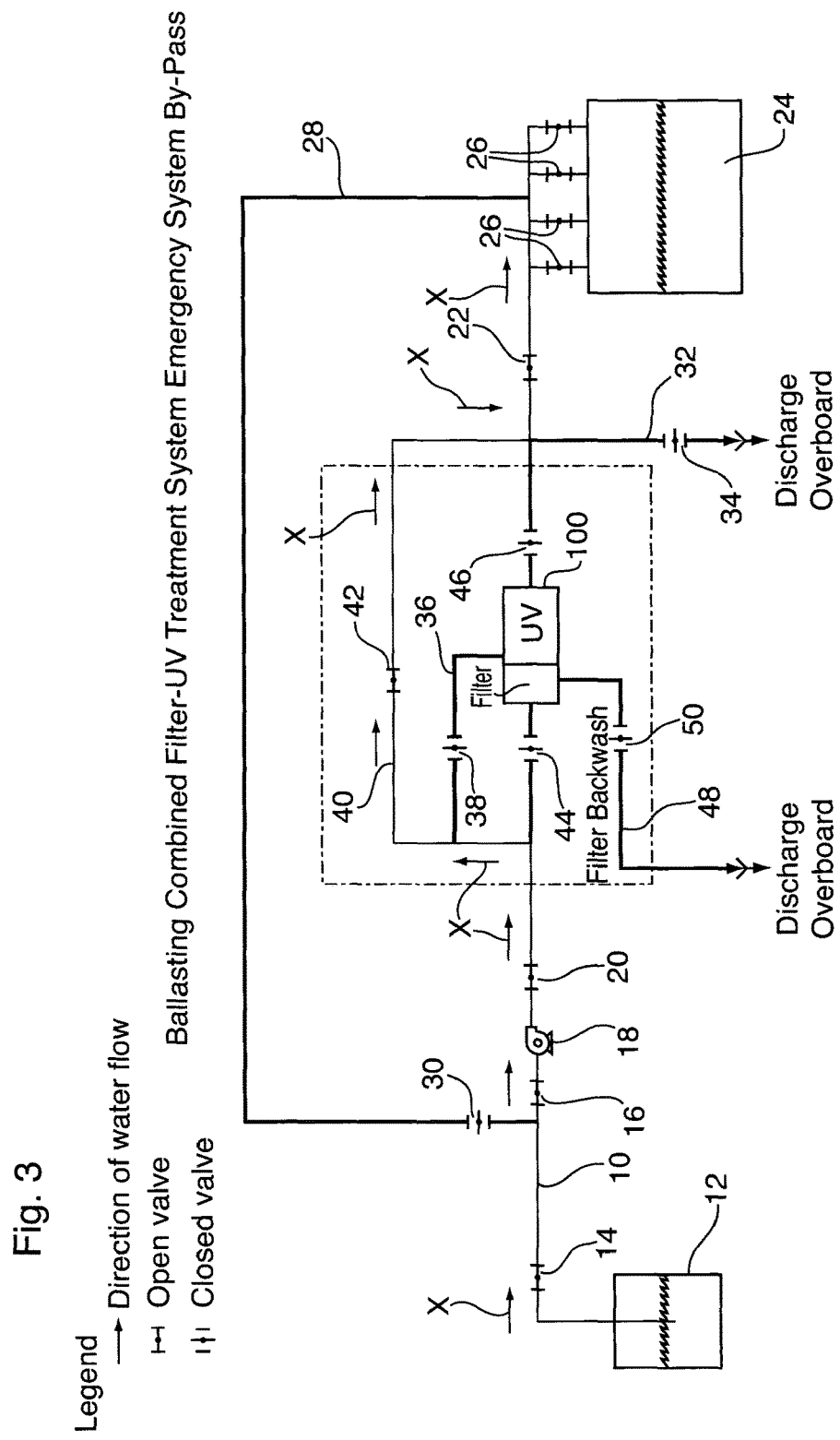
FIG. 3 illustrates a schematic of installation and use of a preferred embodiment of the present fluid treatment system in a shipping vessel operating in the ballasting mode during full bypass of the fluid treatment system.

When it is desired to continue to ballast sea (or other) water from ballast tanks 24 while bypassing fluid treatment system 100, the valves are oriented as shown in FIG. 3 (ballasting) and as follows:

| Valve | Position |
|---|---|
| 14 | open |
| 16 | open |
| 20 | open |
| 22 | open |
| 26 | open |
| 30 | closed |
| 34 | closed |
| 38 | closed |
| 42 | open |
| 44 | closed |

-continued

| Valve | Position |
|---|---|
| 46 | closed |
| 50 | closed |

This result is in flow of water in the direction of arrows X.

Figure 4:
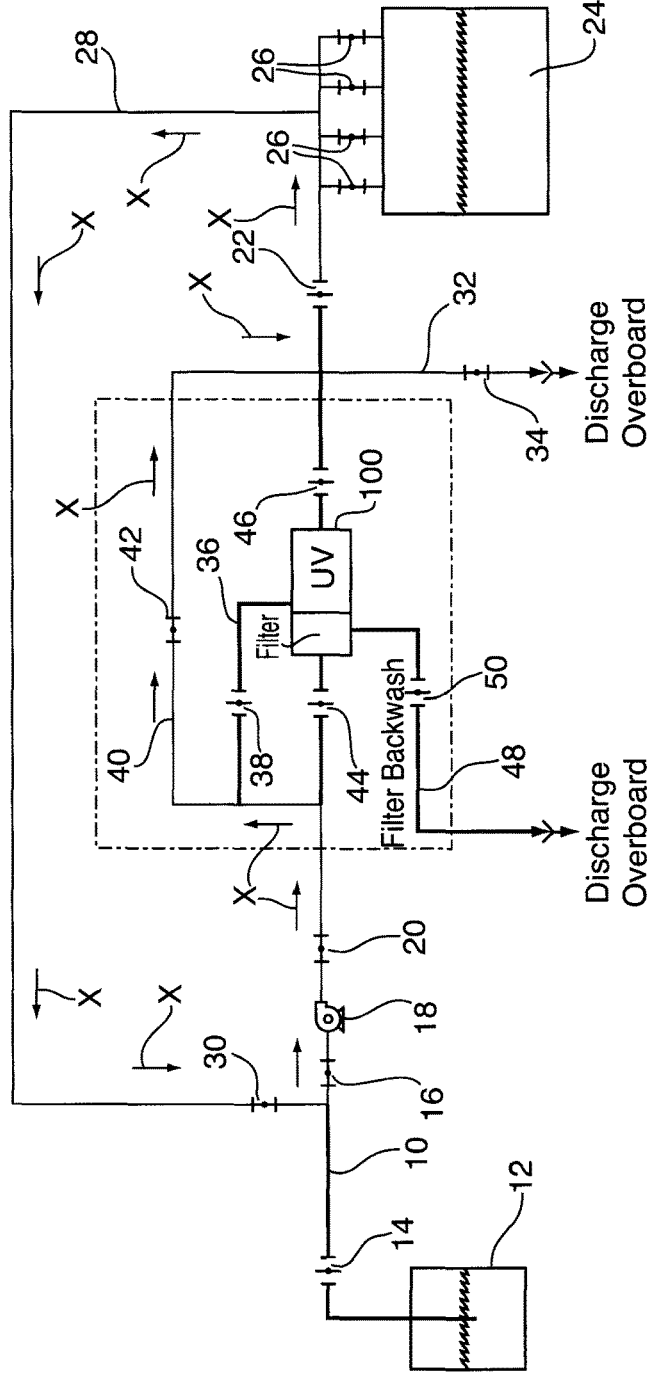
FIG. 4 illustrates a schematic of installation and use of a preferred embodiment of the present fluid treatment system in a shipping vessel operating in the deballasting mode during full bypass of the fluid treatment system.
Figure 5:
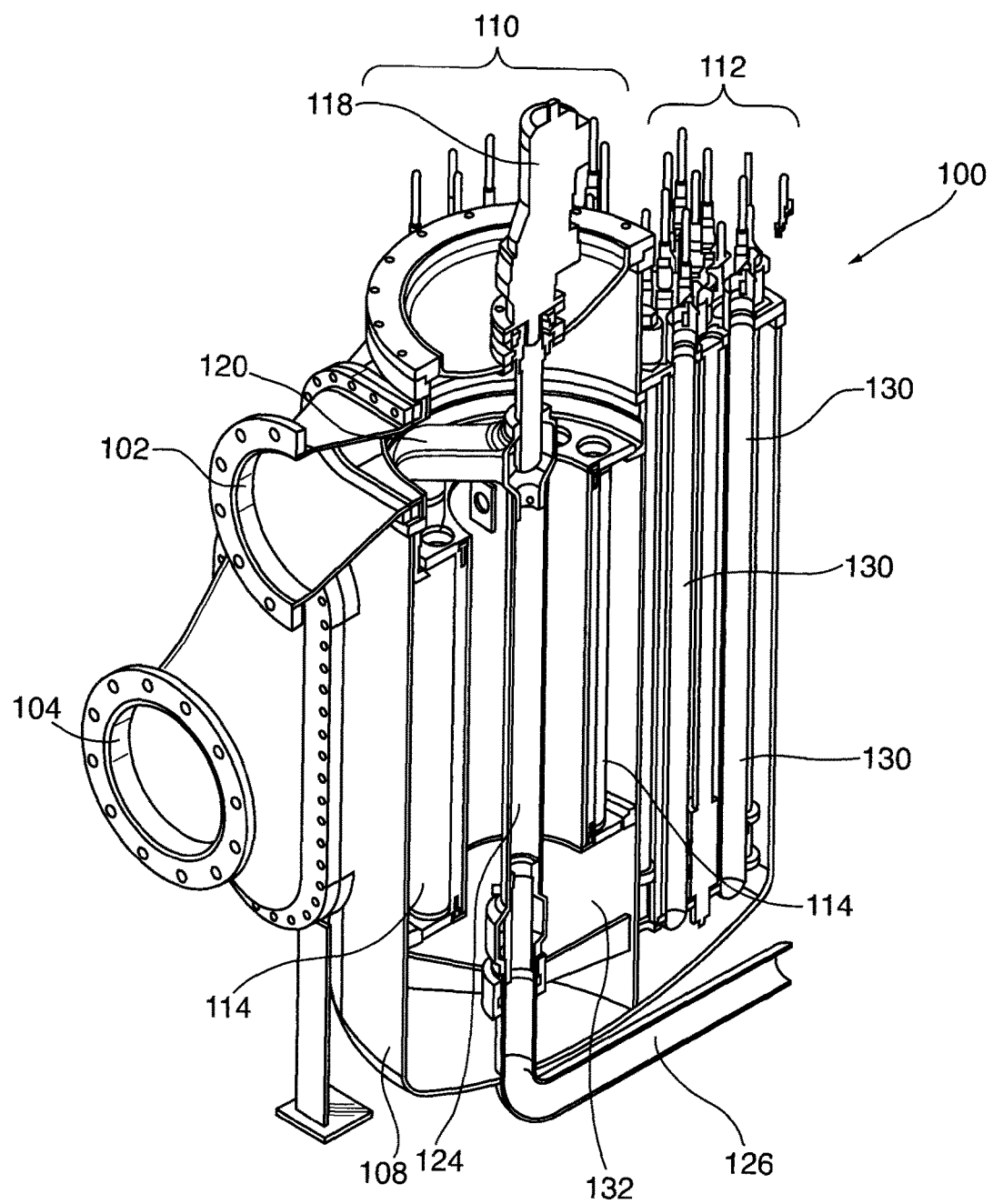
FIG. 5 illustrates a section of a perspective view of a preferred embodiment of the present fluid treatment system.
Figure 6:
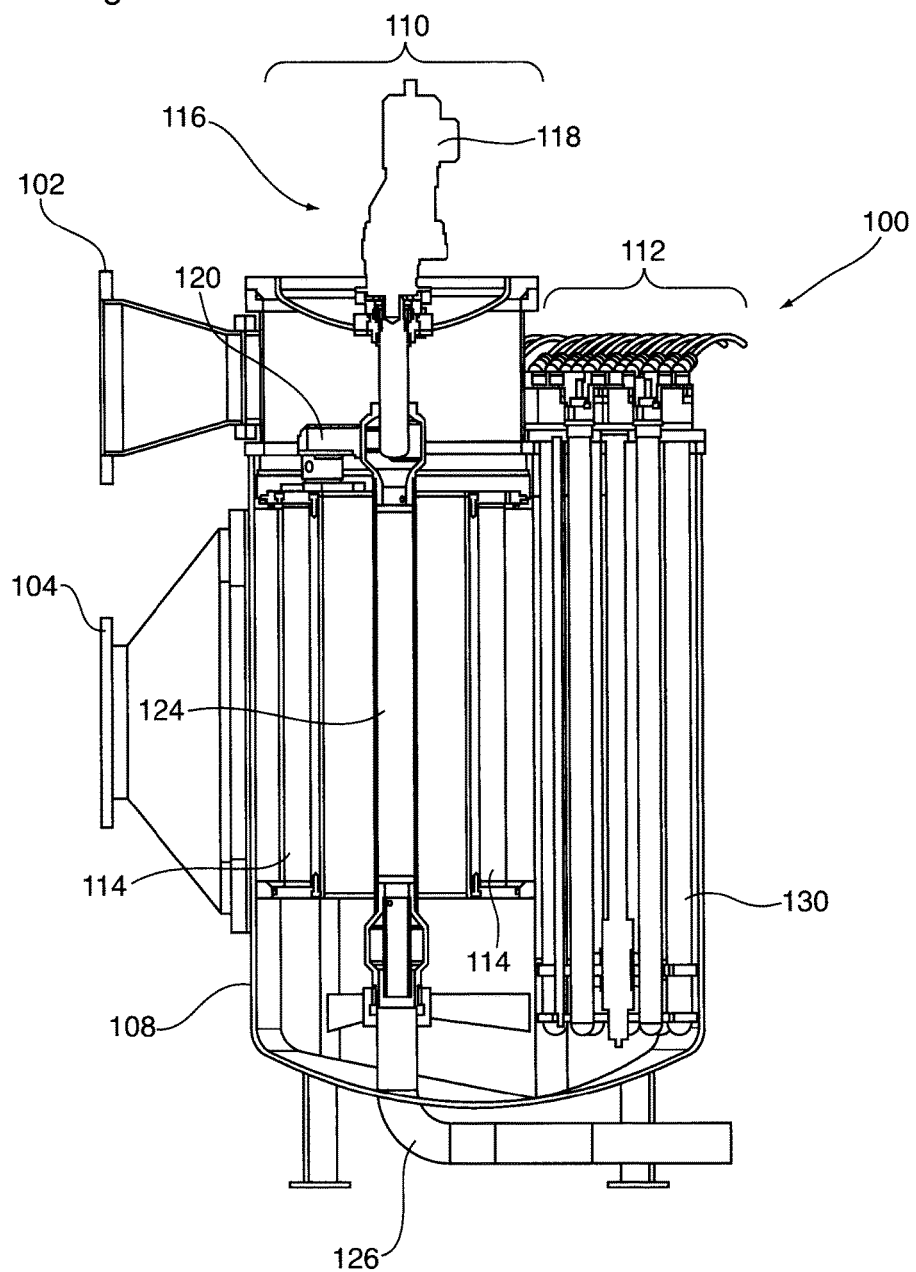
FIG. 6 illustrates a sectional view of a side elevation of the embodiment of the fluid treatment system illustrated in FIG. 5.

When it is desired to continue to deballast sea (or other) water from ballast tanks 24 while bypassing fluid treatment system 100, the valves are oriented as shown in FIG. 4 and as follows:

| Valve | Position |
|---|---|
| 14 | closed |
| 16 | open |
| 20 | open |
| 22 | closed |
| 26 | open |
| 30 | open |
| 34 | open |
| 38 | closed |
| 42 | open |
| 44 | closed |
| 46 | closed |
| 50 | closed |

This result is in flow of water in the direction of arrows X.

With reference to FIGS. 5-14, there is illustrated a fluid treatment system 100. Fluid treatment system 100 comprises a ballasting inlet 102, a deballasting inlet 104 and a fluid outlet 106. Fluid treatment system 100 comprises a housing 108 which contains a filter section 110 and a trio of radiation section 112.

Fluid separation section 110 comprises an annular arrangement of filter elements 114. Disposed in the central region of fluid separation section 110 is a fluid backwash element 116 which consists of a motor 118 having connected thereto a pair of flushing arms 120,122 which are oriented approximately 90° apart. Flushing arms 120,122 are connected to a conduit 124 that is in turn connected to a backwash line 126.

Fluid separation section 110 is configured so that the fluid to be treated must pass within the end openings of filter elements 114 in the direction of arrows A. Filtered water emanates from individual filter elements 114 in the direction of arrows B.

Motor 118 of backwash element 116 is configured to rotate arms 120,122 to cover one end opening of an individual filter element 114 (i.e., the combined effect of having arms 120,122 is that an end opening for two filter elements 114 is covered).

Radiation sections 112 each contain a series of elongate ultraviolet radiation sources 130 which serve to disinfect water which is received from fluid separation section 110.

Figure 7:
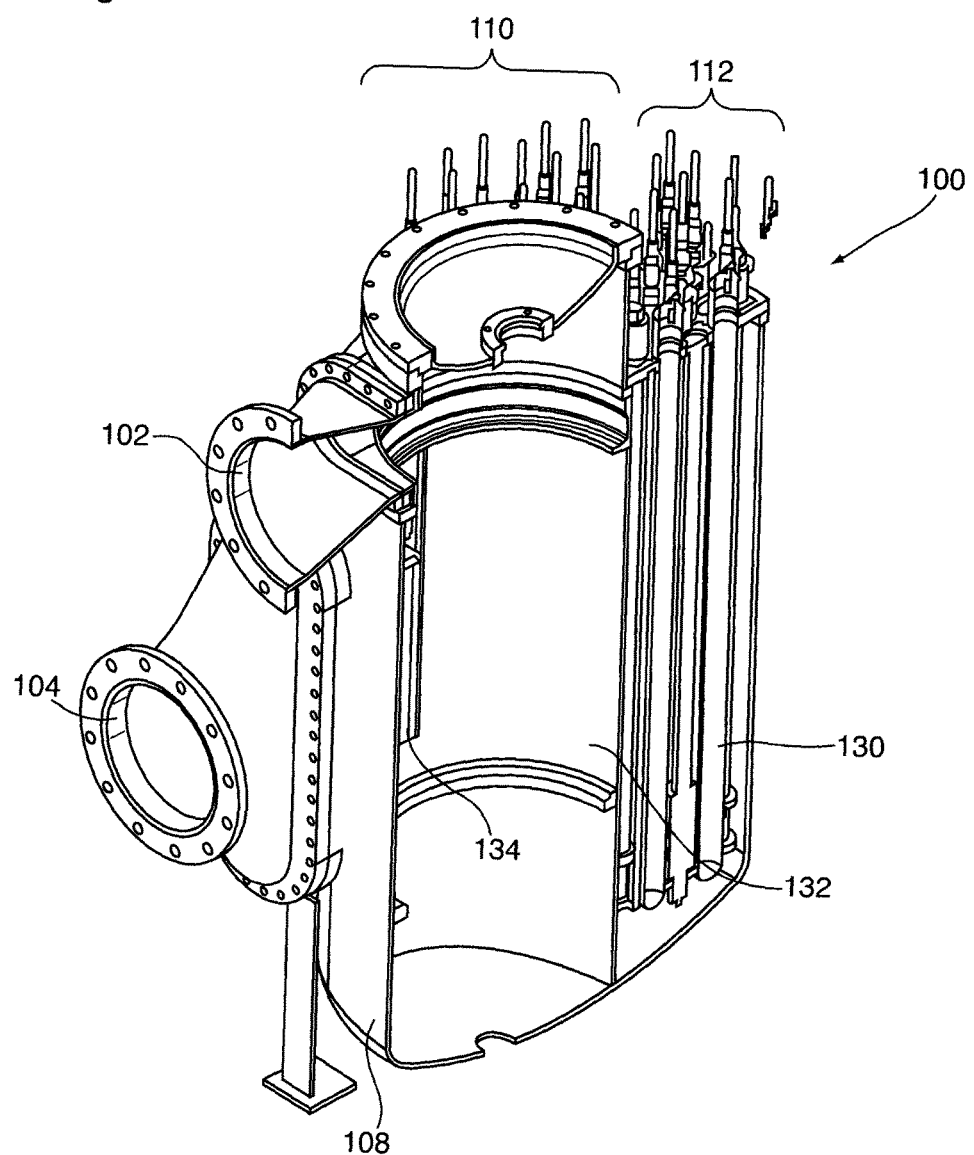
FIG. 7 illustrates a view similar to that shown in FIG. 5 with the exception that the fluid separation section has been removed.
Figure 8:
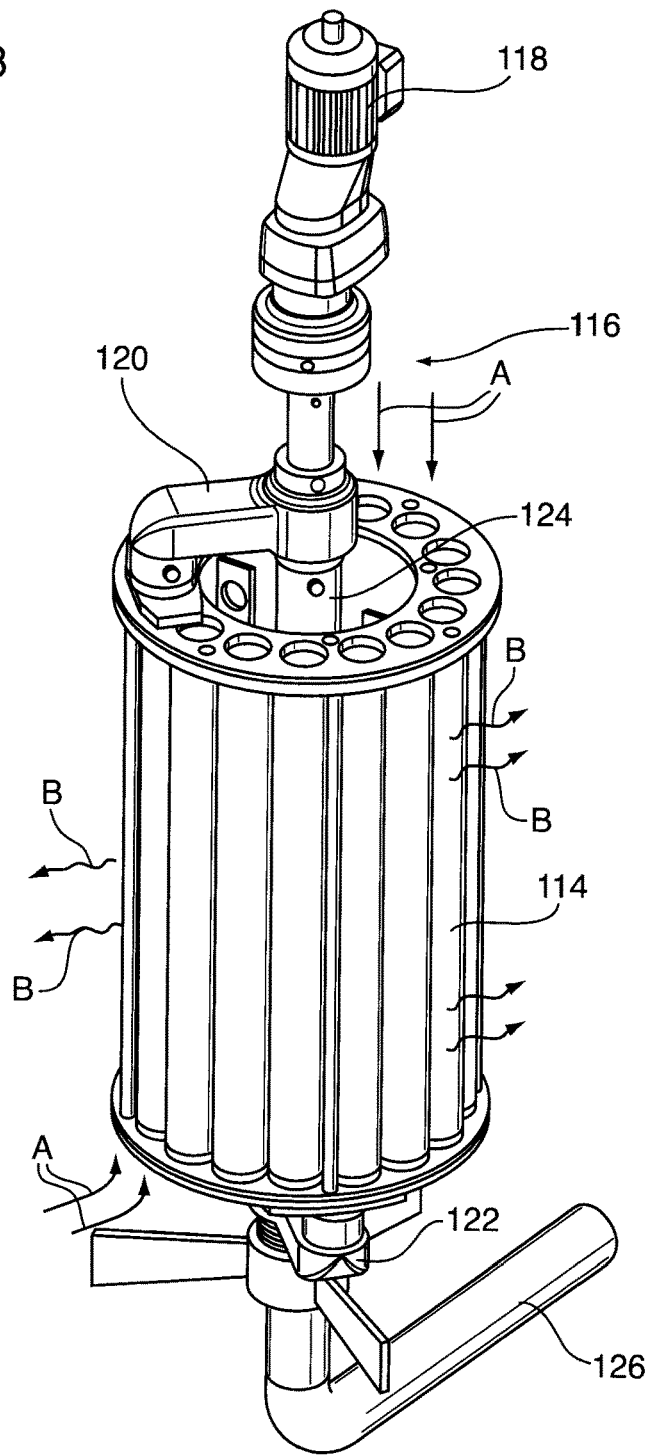
FIG. 8 illustrates a perspective view of the fluid separation section removed from the fluid treatment system illustrated in FIG. 7.

As can be seen particularly in FIG. 7, an isolation wall 132 separates fluid separation section 110 from radiation sections 112. An opening 134 is disposed in isolation wall 132 to permit fluid that has been filtered in fluid separation section 110 to pass to radiation sections 112.

Figure 9:
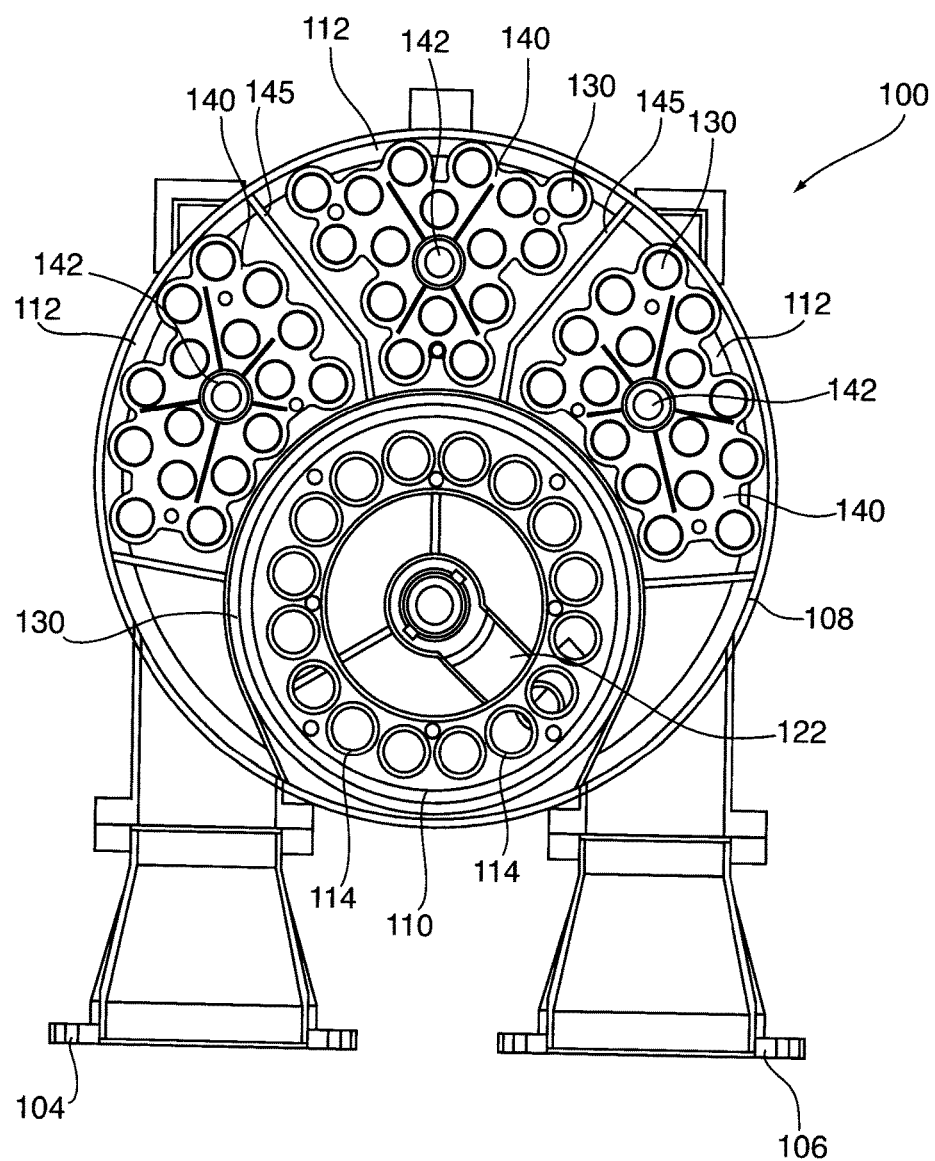
FIG. 9 illustrates a sectional view from the top of the fluid treatment system illustrated in FIG. 1.
Figure 10:
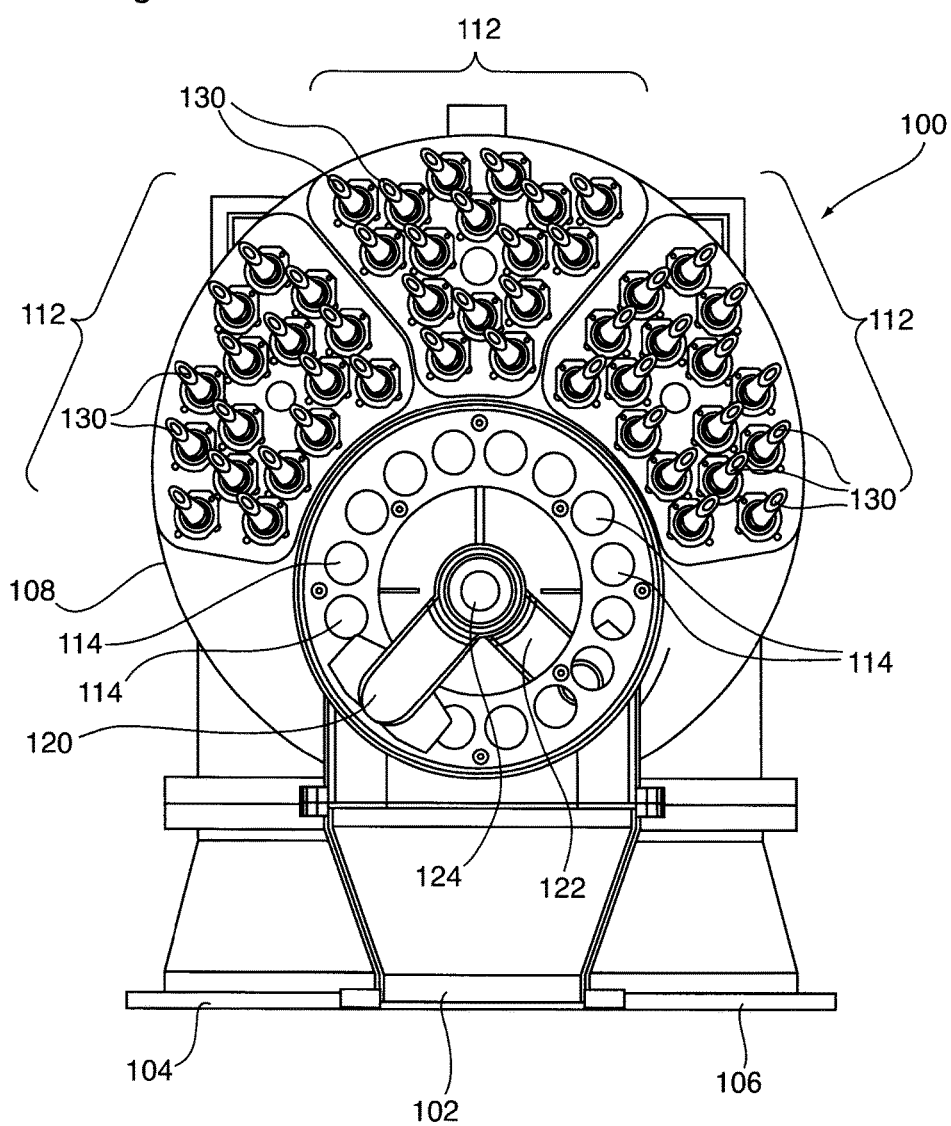
FIG. 10 illustrates a sectional view through a top section of the fluid treatment system illustrated in FIG. 1.

With particular reference to FIG. 9, it can been seen that each radiation section 112 comprises a wiper 140 and a wiper drive 142 which moves wiper 140 to clean the exterior of radiation sources 130 to remove fouling materials. Further, a baffle plate 145 is disposed between each pair of adjacent radiation sections 112.

Figure 11:
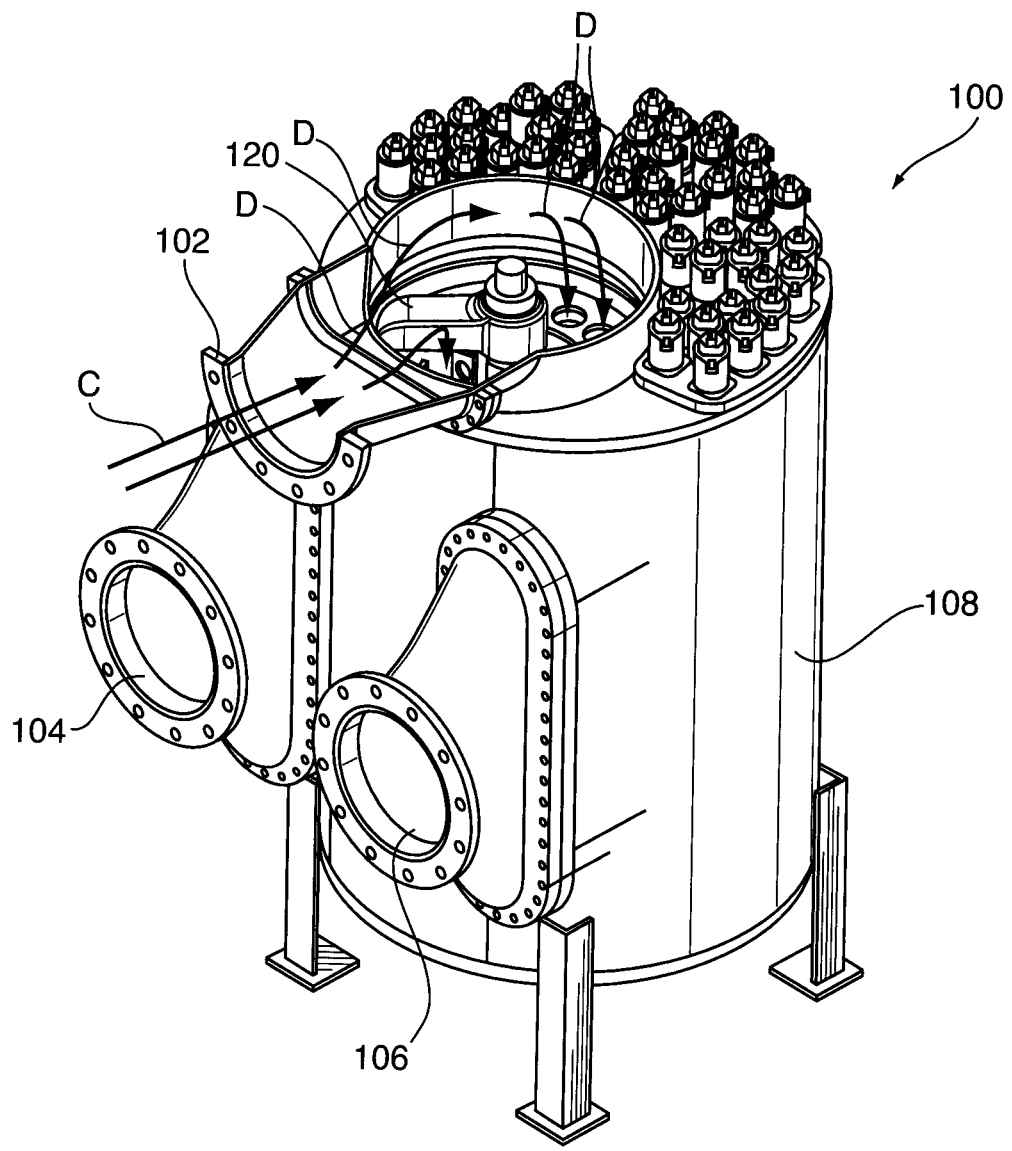
FIGS. 11-14 illustrate perspective views at various sections of the fluid treatment system illustrated in FIG. 1 operating in various modes which will be discussed herein below.
Figure 12:
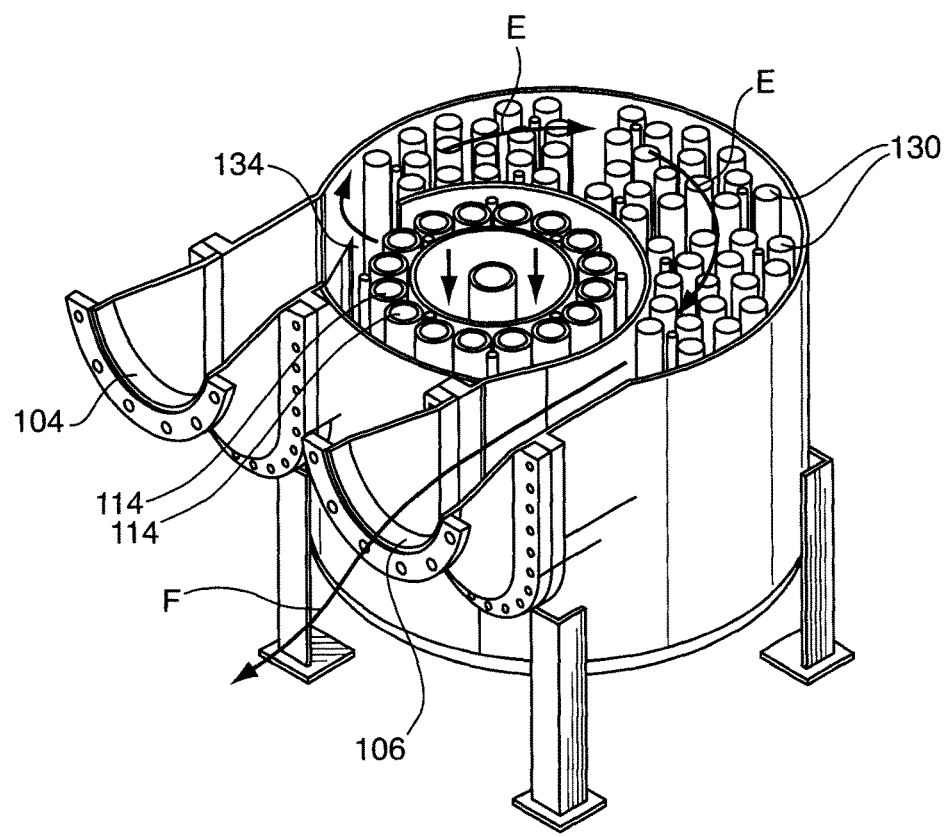
Figure 13:
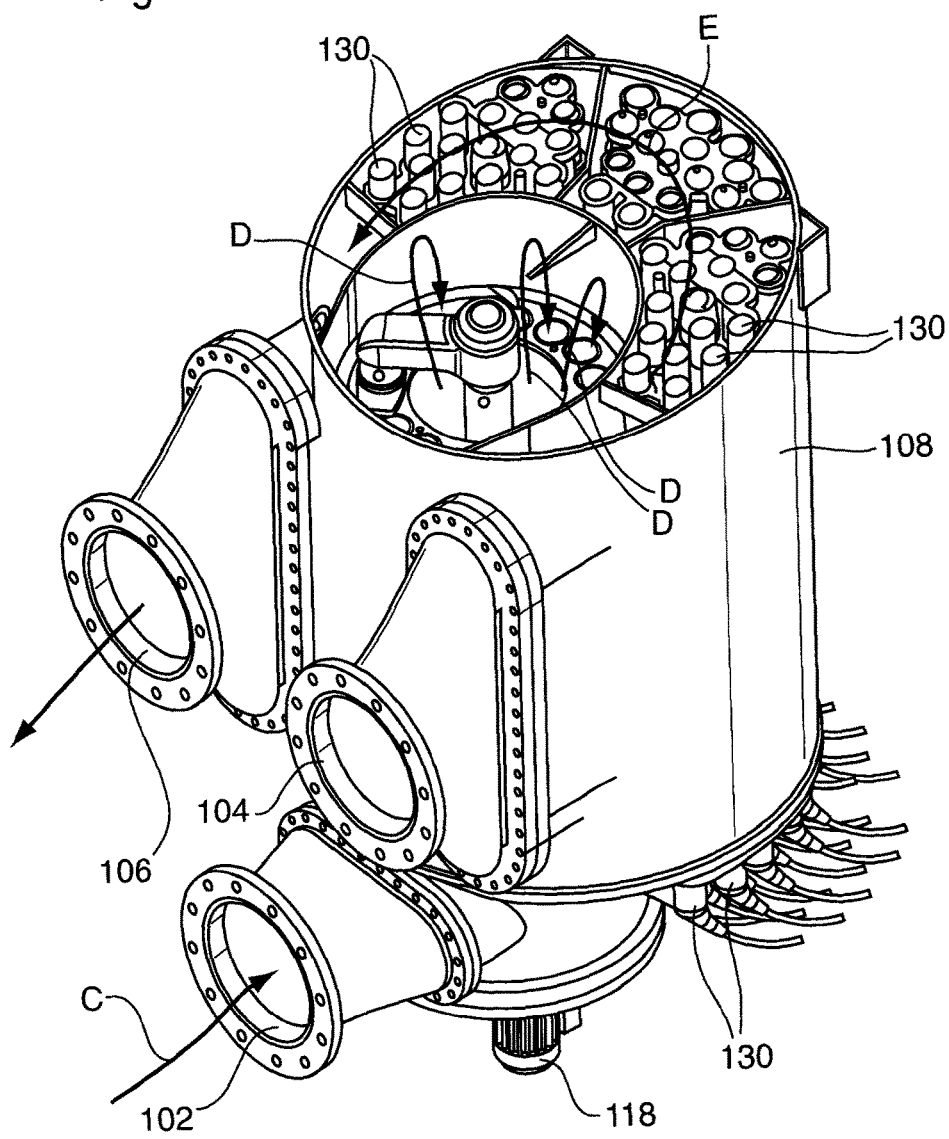

With particular reference to FIGS. 11-13, there is shown the flow path of fluid as it progresses through fluid treatment system 100 during the ballasting mode thereof. Thus, in FIG. 11, fluid enters fluid ballast inlet 102 in the direction of arrow C and continues in the direction of arrows D to enter the individual filter elements 114 from the top (FIG. 11) and the bottom (FIG. 13).

With particular reference to FIG. 12, fluid that has been filtered through filter elements 114 exits fluid separation section 110 via opening 134 and enters fluid radiation section 112 where it travels in the direction of arrows E so that it passes through each of the three radiation sections 112 and exits via fluid outlet 106 in the direction of arrow F.

Figure 14:
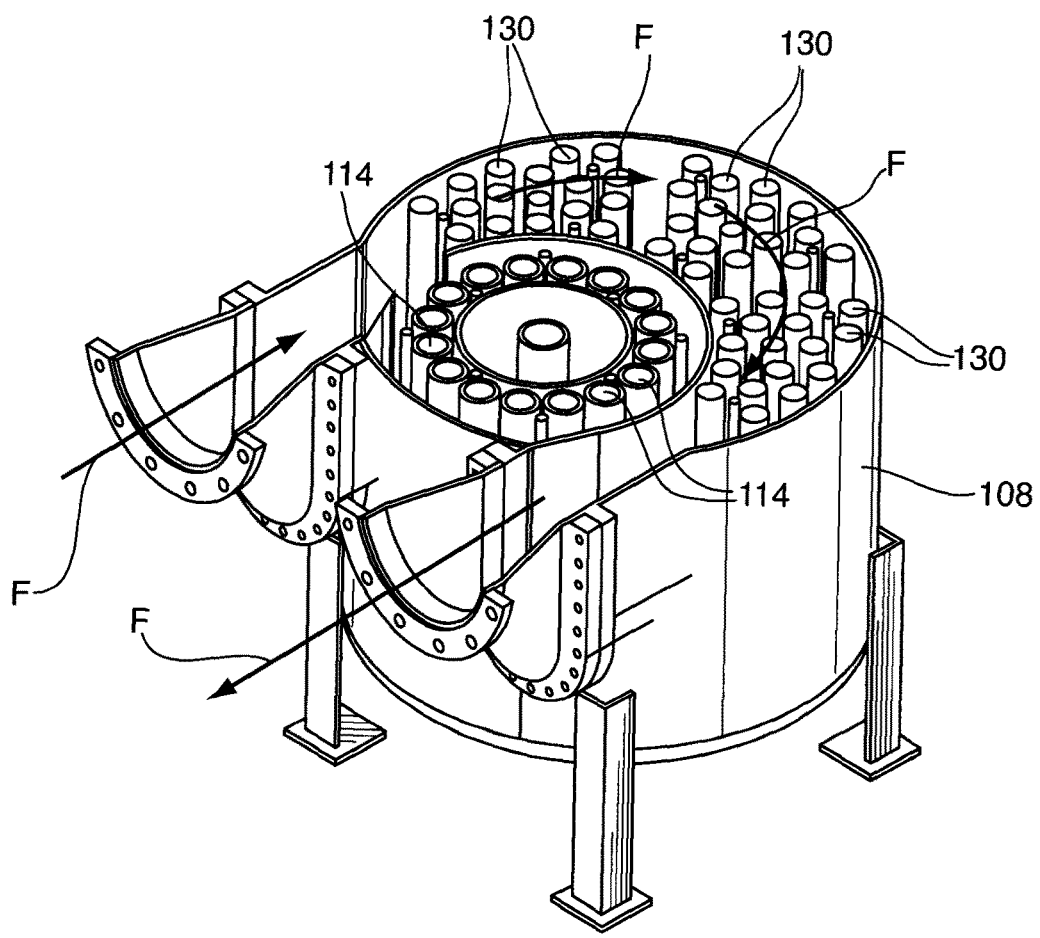

With reference to FIG. 14, the fluid path flow through fluid treatment system 100 is shown in the deballasting mode of the system. Here it can be seen that fluid enters the ballasting fluid inlet 104 and passes through radiation sections 112 without being passed through fluid separation section 110. The flow of fluid is depicted by arrows F.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A fluid treatment system comprising:
   a housing;
   a first fluid inlet in the housing;
   a second fluid inlet in the housing;
   a fluid outlet in the housing;
   a fluid treatment zone disposed in the housing, the fluid treatment zone comprising a fluid separation section and a fluid radiation section in fluid communication with one another and in fluid communication with the first fluid inlet, the second fluid inlet and the fluid outlet, at least a portion of the fluid separation section being disposed within at least a portion of the fluid radiation section; and
   a programmed system control operating a valve system in each of:
   (i) a first mode in which the valve system causes fluid to pass through the first fluid inlet and then through the fluid separation section and fluid radiation section and then through the fluid outlet,
   (ii) a second mode in which the valve system causes fluid to pass through the second fluid inlet so as to substantially bypass the fluid separation section and pass through the fluid radiation section and then through the fluid outlet,
   (iii) a third mode in which the valve system causes fluid to substantially bypass the fluid treatment system, and
   (iv) a fourth mode in which the valve system causes fluid to backwash through the fluid separation section, wherein the backwash element comprises a backwash valve element configured to be operated between an open position in which at least one separation element is backwashed and a closed position to define a backwash cycle.

2. The fluid treatment system defined in claim 1, wherein the valve system comprises a first valve element and a second valve element.

3. The fluid treatment system defined in claim 2, wherein, in the first mode, the first valve element is in an open position and the second valve element is in a closed position.

4. The fluid treatment system defined in claim 2, wherein, in the second mode, the first valve element is in a closed position and the second valve element is in an open position.

5. The fluid treatment system defined in claim 1, wherein the fluid separation section comprises a plurality of separation elements arranged in a separation element array.

6. The fluid treatment system defined in claim 5, wherein each separation element is configured to receive an independent flow of fluid with respect to an adjacent separation element.

7. The fluid treatment system defined in claim 5, wherein each separation element comprises a longitudinal axis that is substantially parallel with respect to a longitudinal axis of at least two adjacent separation elements.

8. The fluid treatment system defined in claim 1, wherein the valve system comprises a third valve element and, in the third mode, the first valve element is in closed position, the second valve element is in a closed position and the third valve element is in an open position.

9. The fluid treatment system defined in claim 1, wherein the fluid radiation section comprises at least one elongate radiation source assembly.

10. The fluid treatment system defined in claim 9, wherein the elongate radiation source assembly comprises a longitudinal axis that is configured to be transverse to the direction of fluid flow through the fluid radiation section.

11. The fluid treatment system defined in claim 1, wherein the fluid separation section and the fluid radiation section are disposed serially along a direction of fluid flow through the fluid treatment zone.

12. The fluid treatment system defined in claim 1, wherein the fluid separation section and the fluid radiation section are disposed non-coaxially along a direction of fluid flow through the fluid treatment zone.

13. The fluid treatment system defined in claim 1, wherein the fluid separation section and the fluid radiation section are disposed coaxially along a direction of fluid flow through the fluid treatment zone.

14. The fluid treatment system defined in claim 1, wherein the fluid separation section and the fluid radiation section are disposed in a ship.

15. The fluid treatment system defined in claim 1, wherein the housing is pressurized.

16. The fluid treatment system defined in claim 1, wherein the fluid treatment system deballasts a ship.

17. A fluid treatment system comprising:
a housing;
a first fluid inlet in the housing;
a second fluid inlet in the housing;
a fluid outlet in the housing;
a fluid treatment zone disposed in the housing, the fluid treatment zone comprising (i) a fluid separation section and (ii) a fluid radiation section in fluid communication with one another and in fluid communication with the first fluid inlet, the second fluid inlet and the fluid outlet,
at least a portion of the fluid separation section being disposed within at least a portion of the fluid radiation section,
wherein the fluid separation section comprises a plurality of separation elements arranged in a separation element array,
wherein the fluid separation section further comprises a backwash element, the backwash element including an arm portion rotatably movable with respect to adjacent separation elements; and
a programmable system control programmed to operate a valve system in each of:
(i) a first mode in which the valve system causes fluid to pass through the first fluid inlet and then through the fluid separation section and fluid radiation section and then through the fluid outlet,
(ii) a second mode in which the valve system causes fluid to pass through the second fluid inlet so as to substantially bypass the fluid separation section and pass through the fluid radiation section and then through the fluid outlet,
(iii) a third mode in which the valve system causes fluid to substantially bypass the fluid treatment system, and
(iv) a fourth mode in which the valve system causes fluid to backwash through the fluid separation section, wherein the backwash element comprises a backwash valve element configured to be operated between an open position in which at least one separation element is backwashed and a closed position to define a backwash cycle.

18. The fluid treatment system defined in claim 17, wherein the valve system comprises a first valve element, and second valve element, and a third valve element, wherein in the third mode, the first valve element is in closed position, the second valve element is in a closed position, and the third valve element is in an open position.

* * * * *